United States Patent
Hughes et al.

(10) Patent No.: US 12,217,444 B2
(45) Date of Patent: Feb. 4, 2025

(54) METHOD FOR MEASURING THE TOPOGRAPHY OF AN ENVIRONMENT

(71) Applicant: Connaught Electronics Ltd., Tuam (IE)

(72) Inventors: Ciaran Hughes, Tuam (IE); Pantelis Ermilios, Tuam (IE); Matthias Lenk, Tuam (IE); Sunil Chandra, Tuam (IE)

(73) Assignee: CONNAUGHT ELECTRONICS Ltd., Tuam (IE)

(*) Notice: Subject to any disclaimer, the term of this patent is extended or adjusted under 35 U.S.C. 154(b) by 200 days.

(21) Appl. No.: 17/784,896

(22) PCT Filed: Dec. 8, 2020

(86) PCT No.: PCT/EP2020/085023
§ 371 (c)(1),
(2) Date: Jun. 13, 2022

(87) PCT Pub. No.: WO2021/116078
PCT Pub. Date: Jun. 17, 2021

(65) Prior Publication Data
US 2023/0351625 A1  Nov. 2, 2023

(30) Foreign Application Priority Data
Dec. 13, 2019 (DE) .................. 10 2019 134 324.0

(51) Int. Cl.
*G06T 7/579* (2017.01)
*G06T 7/593* (2017.01)
(Continued)

(52) U.S. Cl.
CPC .............. *G06T 7/579* (2017.01); *G06T 7/593* (2017.01); *H04N 13/221* (2018.05);
(Continued)

(58) Field of Classification Search
CPC ................ G06T 7/579; G06T 7/593; G06T 2207/30252; G06T 2207/10028;
(Continued)

(56) References Cited

U.S. PATENT DOCUMENTS

2014/0132733 A1  5/2014  Mundhenk et al.
2018/0176551 A1  6/2018  Viswanathan et al.
(Continued)

FOREIGN PATENT DOCUMENTS

CN    104093600 A    10/2014
CN    105849771 A    8/2016
(Continued)

OTHER PUBLICATIONS

Christian N. Scharfenberger; "Panoramic Vision for Automotive Applications: From Image Rectification to Ambiance Monitoring and Driver Body Height Estimation;" Feb. 3, 2011; p. 6, 40, and 116-148; XP055143078; (Year: 2011).*
(Continued)

*Primary Examiner* — Kathleen V Nguyen
(74) *Attorney, Agent, or Firm* — Osha Bergman Watanabe & Burton LLP

(57) ABSTRACT

A method for forming a point cloud corresponding to the topography of an imaged environment involves acquiring an image of the environment with a camera having a WFOV lens mounted on a vehicle; changing the camera pose by an adjustment greater than a threshold; and acquiring another image of the environment with the camera at the changed pose. The images are mapped onto respective surfaces to form respective mapped images, defined by the same non-planar geometry. One of the mapped images is divided into blocks of pixels. For each block, a depth map is formed by performing a search through the other mapped image to evaluate a disparity in the position of the location of the
(Continued)

block of pixels in each of the mapped images. The depth map is converted into a partial point cloud corresponding to the local topography of the environment surrounding the vehicle as it moves through the environment.

16 Claims, 13 Drawing Sheets

(51) Int. Cl.
 *H04N 13/221* (2018.01)
 *H04N 13/243* (2018.01)
(52) U.S. Cl.
 CPC . *H04N 13/243* (2018.05); *G06T 2207/10028* (2013.01); *G06T 2207/20021* (2013.01); *G06T 2207/30252* (2013.01)
(58) Field of Classification Search
 CPC ........... G06T 2207/20021; G06T 2207/30026; H04N 13/221; H04N 13/243
 See application file for complete search history.

(56) References Cited

U.S. PATENT DOCUMENTS

| 2019/0188906 A1 | 6/2019 | Krishna |
| 2019/0349571 A1 | 11/2019 | Herman et al. |
| 2021/0158493 A1* | 5/2021 | Slutsky ................. G06T 3/4038 |

FOREIGN PATENT DOCUMENTS

| DE | 102019114404 A1 | 12/2020 |
| DE | 102019126814 A1 | 4/2021 |
| DE | 102019131971 A1 | 5/2021 |
| JP | H03-113305 A | 5/1991 |
| JP | 2011/064566 A | 3/2011 |
| JP | 2013-025528 A | 2/2013 |
| WO | 2013/190772 A1 | 12/2013 |

OTHER PUBLICATIONS

Christian N. Scharfenberger; "Panoramic Vision for Automotive Applications: From Image Rectification to Ambiance Monitoring and Driver Body Height Estimation;" Feb. 3, 2011; p. 6, 40, and 116-148; XP055143078; Retrieved from the Internet: URL: http://mediatum.ub.tum.de/doc/1002339/1002339.pdf (206 pages).
Jun'ichi Yamaguchi; "Three Dimensional Measurement Using Fisheye Stereo Vision, Advances in Theory and Applications of Stereo Vision" Chapter 8; Jan. 8, 2011; pp. 151-164 (16 pages).
Zhigang Zhu; "Omnidirectional Stereo Vision;" Workshop on Omnidirectional Vistion, in the 10th IEEE ICAR; Aug. 22-25, 2001 (12 pages).
Bogdan Khomutenko et al.; "Direct Fisheye Stereo Correspondence Using Enhanced Unified Camera Model and Semi-Global Matching Algorithm;" ICARCV 2016, Nov. 2016, Phuket, Thailand (7 pages).
Shigang Li; "Binocular Spherical Stereo;" IEEE Transactions on Intelligent Transportation Systems; vol. 9; No. 4; Dec. 2008; pp. 589-600 (12 pages).
Steffen Abraham et al; "Fish-Eye-Stereo Calibration and Epipolar Rectification;" ISPRS Journal of Photogrammetry and Remote Sensing; vol. 59; Issue 5; 2005; pp. 278-288 (11 pages).
Johannes Schneider et al; "On the Accuracy of Dense Fisheye Stereo;" IEEE Robotics and Automation Letters; Jan. 12, 2016; pp. 227-234 (8 pages).
Marius Drulea et al; "Omnidirectional stereo vision using fisheye lenses;" 2014 IEEE 10th International Conference on Intelligent Computer Communication and Processing (ICCP); Sep. 4-6, 2014; pp. 251-258 (8 pages).
Stefan K. Gehrig; "Large Field of View Stereo for Automotive Applications" OmniVis; vol. 1, 2005 (8 pages).
International Search Report and Written Opinion in corresponding International Application No. PCT/EP2020/085023, mailed Mar. 9, 2021 (10 pages).
Office Action Issued in Corresponding JP Application No. 2022-535783, dated Jun. 30, 2023. (9 pages with English Translation).
First Office Action in corresponding Chinese Application No. 202080095163.6, dated Nov. 30, 2024 (21 pages).

* cited by examiner

METHOD FOR MEASURING THE TOPOGRAPHY OF AN ENVIRONMENT

FIELD

The present application relates to a method for measuring the topography of a environment that is imaged by a camera. More specifically, it relates to a method to measure the topography of an environment that is imaged using dense depth measurements evaluated from motion stereo images of the environment.

BACKGROUND

A camera is a device for producing an image of a scene or environment. When two cameras produce images of the same scene from different locations, the different images may be compared to ascertain the depth of parts of the scene, the depth being a measure of the relative distance from a plane defined by the two camera locations. Under certain assumptions and/or with certain information, the relative depth can be calibrated into an absolute distance measurement. This is the principle of depth from disparity imaging. The depth measurements can be used to approximate the topography of the environment that is imaged.

Typically, depth from disparity imaging requires an N-ocular system where N>1, typically a binocular system having two cameras that produce a synchronised pair of images of a scene. Features in one image of the pair of images may be matched with the corresponding features in the other image. Features may comprise distinct imaged elements such as corners or regions of similar pixels, blobs, but features may also comprise any given pixel of an image. The difference in the positioning of the matched features between the images can then be used to calculate the disparity. From the disparity in the features and the known separation of the cameras of the binocular system, the depth of the features can be evaluated. Often the images acquired by the binocular system are mapped to surfaces to aid subsequent image processing or to make the acquired images more suitable for viewing.

"Large Field of View Stereo for Automotive Applications" by Gehrig in OmniVis, 1, 2005, relates to cameras that are placed to the left and right of a rear-view mirror of an automobile, and describes options to analyse stereo vision with large fields of view and perform object detection.

"Three Dimensional Measurement Using Fisheye Stereo Vision, Advances in Theory and Applications of Stereo Vision" by Yamaguchi in chapter eight of the book "Three Dimensional Measurement Using Fisheye Stereo Vision, Advances in Theory and Applications of Stereo Vision" published in 2011, discloses mapping fisheye imagery on to a plane and matching features, and concludes that fisheye stereo vision allows measurement of 3D objects in relatively large spaces.

"Omnidirectional Stereo Vision" by Zhu in IEEE ICAR, 2001, relates to configurations of omnidirectional stereo imaging and presents numerical analysis on omnidirectional representations, epipolar geometry and depth error characteristics.

"Direct Fisheye Stereo Correspondence Using Enhanced Unified Camera Model and Semi-Global Matching Algorithm" by Bogdan et al in ICARCV 2016, presents a model for fisheye cameras that projects straight lines onto conic sections, and describes a matching algorithm for fisheye stereo systems to compute a dense direct stereo correspondence without rectification of the fisheye images.

"Binocular Spherical Stereo" by Li in IEEE trans. on Intelligent Transportation Systems 9, 589, 2008, relates to a binocular fisheye stereo and describes transforming to spherical images and using latitude-longitude representations to speed up the feature point matching.

"Fish-Eye-Stereo Calibration and Epipolar Rectification" by Abraham et al in J. of Photogrammetry and Remote Sensing 59, 278, 2005, relates to calibration and epipolar rectification for fisheye stereo imagery and discusses generating epipolar images.

"On the Accuracy of Dense Fisheye Stereo" by Schnedier et al in IEEE Robotics and Automation, 1, 227, 2016, analyses an epipolar rectification model for fisheye stereo cameras and discusses the associated accuracy.

"Omnidirectional stereo vision using fisheye lenses" by Drulea et al IEEE, ICCP, 2014, relates to an omnidirectional stereo system and division of fisheye images into rectified images. A stereo matching algorithm is applied to each pair of rectified images to form a point cloud.

It is an object of the present invention to overcome at least some of the limitations of this related work.

SUMMARY

The present invention is defined by the independent claim.

Embodiments of the present invention provide a method to recover dense, accurate depth information from images acquired by a camera with a wide field of view lens. This enables images from a monocular camera on a vehicle to form a portion of a point cloud corresponding to the local topography of an environment surrounding a vehicle as it moves through the environment.

The dependent claims provide further optional features.

BRIEF DESCRIPTION OF THE DRAWINGS

Embodiments of the invention will now be described, by way of example, with reference to the accompanying drawings, in which.

DESCRIPTION

For many tasks involving driving vehicles, acquiring information about the local environment is important to safely complete the task. For example, when parking a vehicle, it is advantageous to display a live image of the environment around a vehicle to a driver.

The driver of the vehicle does not need to be human since the vehicle may be self-driving i.e. an autonomous vehicle. In this case, the accuracy of the acquired information is particularly important to identify objects and avoid the acquired information misleading the vehicle driving system. The driver could also be a combination of a human and one or more automated systems to assist driving.

The sensitivity of the cameras used in the invention need not be limited to any particular range of wavelengths but most commonly it will be used with cameras that are sensitive to visible light. The camera will generally be in the form of a camera module comprising a housing for a lens and a sensor, the lens serving to focus light onto the sensor. The camera module may also have electronics to power the sensor and enable communication with it, as well as possibly processing electronics to process the image. The processing can be low level image signal processing, for example, gain control, exposure control, white balance, denoise, etc. and/or it can involve more powerful processing for example, for computer vision.

Figure 1:
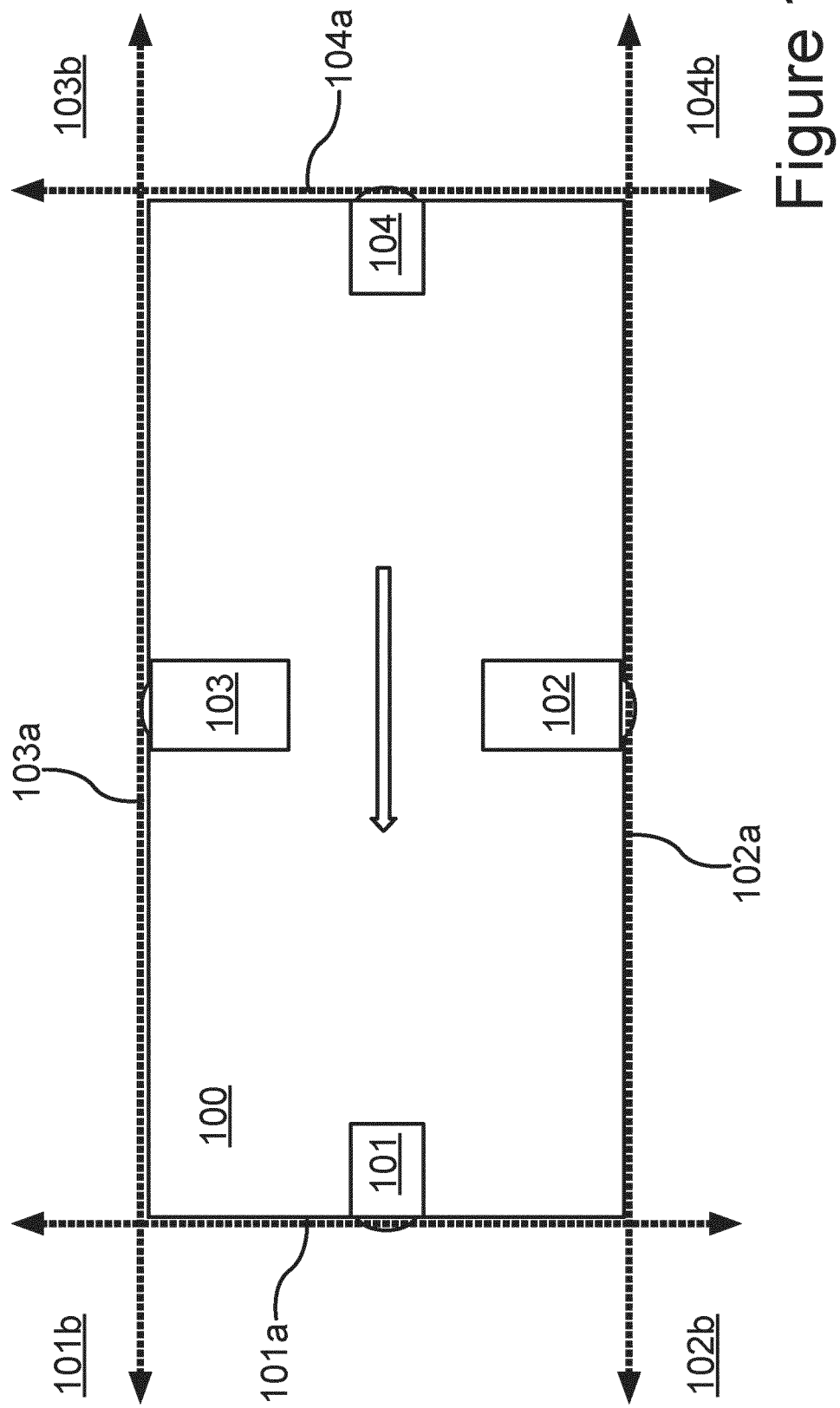
FIG. 1 shows schematically a vehicle with mounted cameras, each capable of operating according to the present invention.

When imaging the environment around a vehicle one camera will generally not have an adequate field of view to acquire all the required data. One way to address this problem is to use multiple cameras. In FIG. 1, a vehicle 100 is shown with four cameras 101, 102, 103, 104 located around the periphery of the car. One edge of the field of view of each camera is marked with a dotted line 101a, 102a, 103a, 104a. Such a configuration of cameras results in fields of view that overlap in regions 101b, 102b, 103b, 104b. The illustrated configuration is merely exemplary. The disclosed teachings are equally valid with other camera configurations.

The illustrated fields of view subtend approximately 180 degrees. A wide field of view is typically achieved by the camera having a wide field of view lens, such a fisheye lens. A fisheye lens is preferable as these are generally cylindrically symmetric. In other applications of the invention, the field of view may be less or more than 180 degrees. Whilst a fisheye lens is preferred, any other lens that provides a wide field of view can be used. In this context, a wide field of view is a lens having a field of view over 100 degrees, preferably over 150 degrees and more preferably over 170 degrees. Typically, cameras with such a wide field of view result in imaging artefacts and distortions in acquired images.

The lens focuses the light on to sensor that is typically rectangular. The data that is acquired is thus affected by the combined effect of the artefacts and distortion of the lens and the limited sensitive surface effect of the sensor. Consequently, the acquired images are distorted representations of the imaged scene. The acquired distorted images maybe at least partially corrected by a process comprising mapping the acquired data on to another surface. Mapping on some surfaces makes subsequent processing techniques more accurate or easier. Several particularly advantageous surfaces are described in more detail later.

In the context of a vehicle having multiple cameras, such as shown in FIG. 1, it is preferable to display a single image of the local environment rather than multiple images from multiple cameras. Therefore, the images from the cameras are combined. There are multiple known ways to perform this combination. For example, the images can be stitched together by identifying features in overlapping regions. The position of the identified features in the images can then be used to map one image to another. Many other methods to stitch images with overlapping regions are known to the skilled person, for example, German Patent Application No. 102019131971.4 (Ref: 2018PF02667) entitled "An image processing module" filed on 26 Nov. 2019 and German Patent Application No. DE102019126814.1 (Ref: 2019PF00721) entitled "An electronic control unit" filed on 7 Oct. 2019 give examples of electronic control units providing a surround view of a vehicle to assist a driver, especially when parking a vehicle.

If the configuration of the cameras is such that it provides imagery from all directions around the vehicle, as in FIG. 1, the stitched image provides enough information view to produce a view from other directions.

Figure 2:
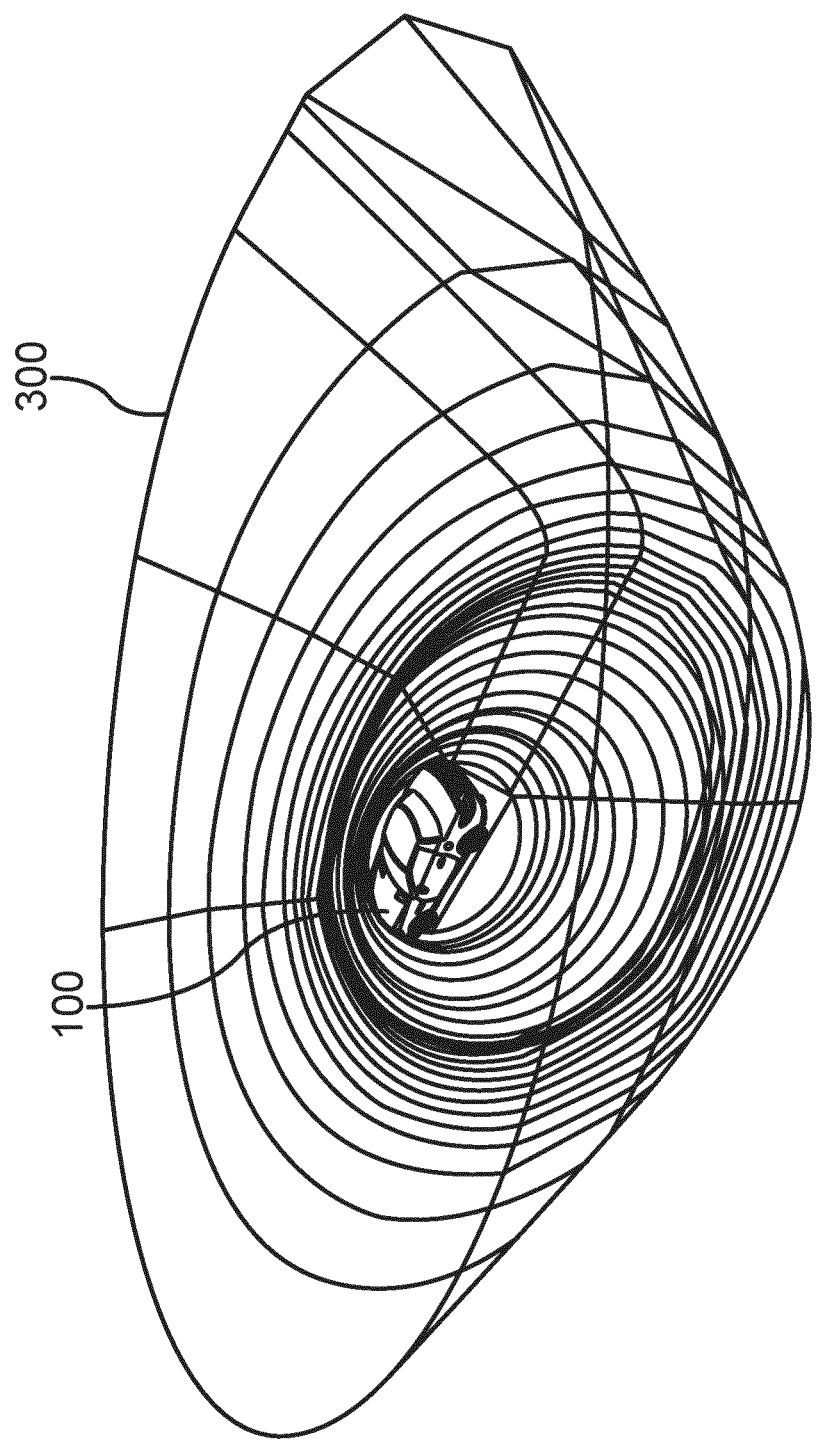
FIG. 2 shows a bowl surface onto which stitched imagery from multiple cameras may be mapped.

As the stitched image comprises flat images stitched together, the stitched image will itself appear flat. A better display of the stitched image can be achieved by mapping the stitched image onto a non-flat surface. As an example, the bowl-shaped surface shown in FIG. 2 may be used. For this surface, nearby objects are mapped onto a flat floor whilst distant objects are mapped onto the side wall of the bowl. As vehicles are often on flat land with objects, such as trees and buildings in the distance, such a mapping typically produces a better, and more accurate display of 30 the stitched image than a flat mapping.

The optimal surface would be a surface corresponding to the topography of the scene that is imaged by the camera. The present invention provides a method to produce an approximation of the surrounding topography by calculation of the depth of parts of images. This is achieved in real time without having to incur the expense of binocular stereo cameras and/or cameras using non-standard lenses.

The Motion Stereo Module

The present invention relates to a method for processing motion stereo images from a monocular camera using a motion stereo module. The motion stereo module recovers dense and accurate depth measurements from pair of images of a scene and thereby allows reconstructing of the topography of the imaged scene. By using the methods described below, the motion stereo module can be operated sufficiently quickly that it can be completed in real-time. In other words, the processing is sufficiently quick that the display of images based on a live camera feed is not adversely affected.

Depth from disparity imaging allows depth measurements to be extracted from a pair of images of a scene. Typically, depth from disparity imaging uses a pair of images acquired from a stereo camera comprising two cameras positioned close to each other or integrated into the same device so that a synchronised pair of images can be directly obtained. However, the present invention is based on a moving monocular camera. The pair of images from the monocular camera is acquired by capturing one image with the monocular camera then adjusting the monocular camera pose, i.e. moving the monocular camera, and acquiring another image.

The resultant depth measurements can be formed into a portion of a 3D point cloud, or similar 3D reconstruction, that approximates the topography of the environment imaged by the camera. The 3D reconstruction enables better assessment and measurement of static features. If the camera is mounted on a car, examples of common static features would include kerbs, ramps, surface irregularities or larger objects such as poles, trees, barriers, walls and parked vehicles, providing valuable information. Consequently, the present invention makes it easier to detect such objects.

It is preferable to have a dense number of depth measurement as this allows a higher resolution 3D reconstruction. Known dense reconstructions techniques require stereo cameras. Relative to monocular cameras, stereo cameras require complex hardware and frame synchronisation but are advantageous because they provide enough binocular disparity for depth estimation and 3D reconstruction irrespective of camera motion, due to the fixed separation between the two cameras.

Stereo and Structure from Motion

Forming 3D reconstruction with moving monocular cameras techniques is typically attempted using classical Structure from Motion techniques. Such techniques produce only a sparse set of depth measurements. Such a sparse set produces a limited set of points in the 3D reconstruction making it less representative of the local topography.

For the present method, the image pair is generated with knowledge of the camera motion between the images captured. Rectification of the image pairs is also generally required before depth for disparity processing commences. Rectification is possible on many surfaces. Epipolar rectification onto spherical or cylindrical surfaces has particular advantages in that the usable field of view is improved while distributing the source image resolution within the rectified images in a favourable way. This is especially important for working with cameras that produce highly distorted shapes, such as camera having a fisheye lens.

Typically, 3D reconstruction methods exploiting binocular disparity and the principles of epipolar geometry take as input at least two images of the same scene captured from different camera poses. The precise movement of the camera (change in position and orientation) may be determined dynamically with computer vision techniques or from inertia sensors. When such a camera is mounted on a vehicle the motion can be at least partially assessed from on-board odometry information. Such information is typically available on the vehicle CAN or FlexRay bus in modern vehicles.

Consequently, to obtain depth measurements, firstly an image of a scene is acquired with a camera; the camera is moved, and another image of the scene is acquired. The resultant images are rectified by mapping onto a common plane or a suitable surface defined by a specific epipolar geometry. The rectified images are processed to assess depth from disparity. For example, a known matching algorithm computes the disparity of all pixels between the rectified images. The disparity information is subsequently converted into depth or directly into a 3D point cloud. In some embodiments, rather than each pixel being matched, blocks of pixels are matched. The blocks of pixels may overlap so that one pixel is included in several blocks of pixels. The blocks need not be rectangular and can be any size that allows matching.

When the monocular camera is coupled to a vehicle, the camera motion can be computed within reasonable accuracy at low accelerations in two degrees of freedom (two parameters) from on-board odometry sensors. Such odometry sensors provide the longitudinal speed and yaw-rate or steering-angle of the vehicle. This information is sufficient if the vehicle motion were truly planar. In practice, however, the vehicle motion is more complex due to the dynamic response of the suspension to road surface irregularities, acceleration, deceleration and turning. This complexity results in instantaneous changes in pitch, roll and height. Also, the mechanical measurements and their transmission on the system bus are subject to latency and are not synchronised by default with the camera frames. German Patent Application No. 102019114404.3 (Ref: 2018PF02113 (SIE0883)) entitled "Image acquisition system" filed 29 May 2019 discloses techniques to deal with these changes in vehicle stance with respect to the road surface.

However, the dynamic motion of the vehicle and camera can be fully characterised in six degrees of freedom (6-DoF) with a minimum of three positional parameters (X, Y, Z) and three rotational parameters (yaw, pitch and roll). The Motion Stereo module produces most reliable and accurate results when the relative camera motion between the two images can be estimated in 6-DoF. The 6-DoF also provides scale information i.e. the length of the translation vector which is used to scale the 3D reconstruction (e.g. point clouds) correctly. The rectified images and the disparity map are invariant to the estimated scale. The known associated relative pose 30 estimation problem is solved using known techniques.

Epipolar Rectification

Figure 3:
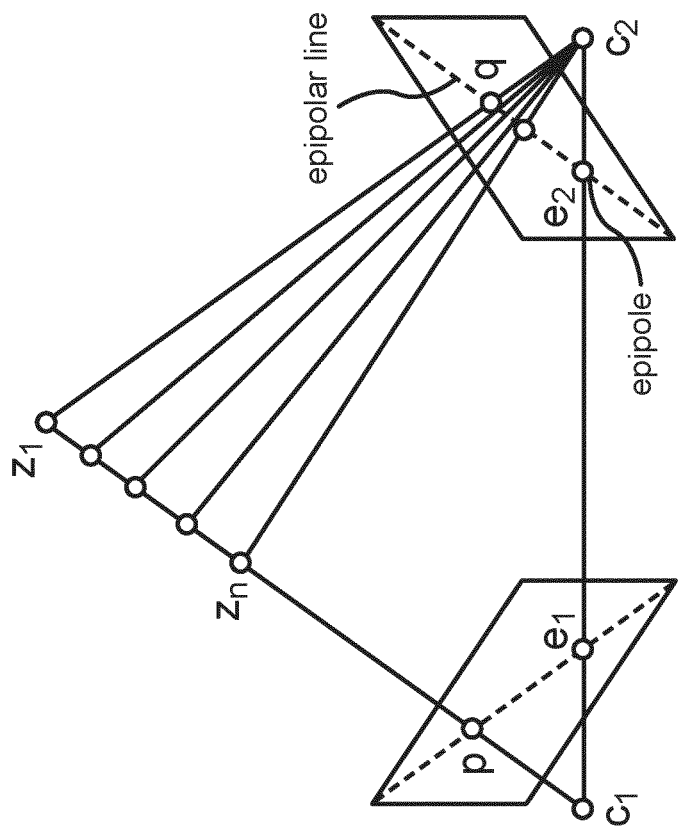
FIG. 3 shows an unrectified stereo camera set-up.

By viewing FIG. 3 and considering cameras $C_1$ and $C_2$ as pinhole cameras and considering virtual image planes in front of the optical centres of the cameras $C_1$ and $C_2$, the following useful terms may be defined. The epipole is the point of intersection of the baseline, which extends between the optical centres, and an image plane. The epipole may be considered as the image, in one camera, of the optical centre of the other camera. The epipolar plane is the plane defined by a 3D point $Z_1$ and the optical centres. The epipolar line is the straight line of intersection of the epipolar plane with the image plane. It is the image in one camera of a ray through the optical centre and image point in the other camera. All epipolar lines intersect at the epipole.

For motion stereo, depth analysis may be performed using known stereo matching modules (e.g. Renesas STV hardware accelerator), which takes as input rectified images, meaning two images where epipolar lines have been mapped onto horizontal scanlines and at the same vertical offset in both images. In principle, the geometry of any scene can be reconstructed from two or more images that are captured from different camera poses by knowledge of feature point correspondences between these images.

Figure 4:
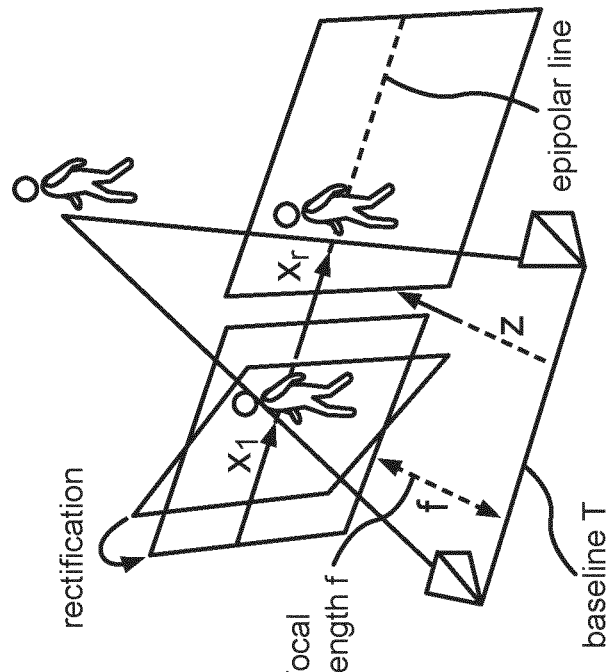
FIG. 4 illustrates disparity in a rectified stereo camera set-up.

Given such correspondences e.g. in the form of a dense optical flow field, the 3D point cloud or 3D reconstruction, can be computed by a mathematical process known as triangulation where rays are back-projected from the camera viewpoints through their respective image points and intersected in 3D space by minimising an error metric. However, unlike optical flow, for epipolar (i.e. stereo) rectification, the correspondence problem is reduced into a 1D search along conjugate epipolar lines and triangulation is simplified into a simple formula solving ratios between similar triangles. The 1D searches, are performed efficiently by the stereo matching algorithm which typically applies techniques to aggregate information from multiple searches and produce robust 1D correspondences in the form of a disparity map. In this way, most of the computational burden of triangulation is transferred into the epipolar rectification. An example of this effect can be seen on in FIG. 4 in which the rectification of the image on the left results in horizontal epipolar lines, in contrast to FIG. 3 in which the epipolar are diagonal across the image plane.

Knowledge of the intrinsic calibration parameters and of the relative pose of the camera for each captured image, where one image provides the reference pose, allows calibration of the image. The reference pose may be given with respect to an external frame of reference or could be set arbitrarily set to zero i.e. with the camera origin at (0, 0, 0) and axes defined by the standard basis vectors (identity rotation matrix). The intrinsic parameters may always be assumed to be known and constant. However, this may not always be a safe assumption e.g. due to variations caused by the thermal expansion and contraction of materials comprising the camera. An alternative approach is to compensate for any variation by characterising and accounting for such variation, or by using an online intrinsic calibration method to update periodically the intrinsic calibration information stored in the system.

In motion stereo, the relative pose varies according to the motion of the vehicle and can be estimated dynamically for each stereo image pair. The relative pose is fully determined by a minimum of 6 parameters (3 positional and 3 rotational parameters) i.e. in 6 degrees of freedom or can be determined 'up to scale' by a minimum of 5 parameters (3 rotational and 2 positional parameters) i.e. in 5 degrees of freedom where the 6th degree (scale) is missing. In the latter, the two positional parameters represent the direction of the translation vector e.g. in projective coordinates or spherical coordinates of unit length. The lack of 'scale' or the so called 'scale ambiguity' is a typical hurdle in monocular computer vision that arises from the simple fact that the scene geometry and the camera translation vector can be scaled together without affecting the locations of feature points and their correspondences in the captured images, therefore in the reverse sense, the scale cannot generally be recovered from such correspondences alone. Note that estimating scale, or absolute scaling, is not necessary for epipolar rectification. In other words, the epipolar rectified images are invariant to the estimated scale as the 5 degrees of freedom (3 rotational and 2 positional parameters) provide enough information. However, the scaling allows the correct depth measurement to be obtained, enabling a more realistic 3D reconstruction (i.e. correct 3D point cloud coordinates) to be formed.

The epipolar rectification can be performed by mapping the images directly into suitable planes or surfaces and resampling them in a way that meets two simple geometric constraints—conjugate epipolar lines or curves are mapped along horizontal scanlines and at the same vertical offset in both rectified images. The simplest form of epipolar rectification uses two co-planar surfaces (image planes) orientated parallel to the baseline (camera translation vector) and a cartesian sampling grid. For cameras using fisheye lens, this method severely limits the field of view obtained due to the mathematical limitations of perspective projection and the loss of quality in the rectified images due to wide-angle perspective effects such as pixel 'stretching'.

Even if multiple planes were used to increase the reconstructed field of view, these still cannot reach areas close to the focus of expansion as this would need image planes approaching infinite size. This a particular concern for the forward and backward-pointing cameras on a vehicle, where the focus of expansion is located roughly around the centre of the fisheye image when the vehicle is moving on a straight path.

The focus of expansion in side facing or wing-mirror cameras is located typically in an area of the image that is of lower interest. However, even for these cameras, planar surfaces impose limitations in the reconstructed field of view.

Generalised Epipolar Rectification

To mitigate the above issues and enhance the reconstructed field of view in the horizontal direction (HFOV), vertical direction (VFOV) or both directions, non-planar mapping surfaces such as spheres, cylinders or polynomial surfaces can be used 25 effectively for epipolar rectification.

Figure 5B:
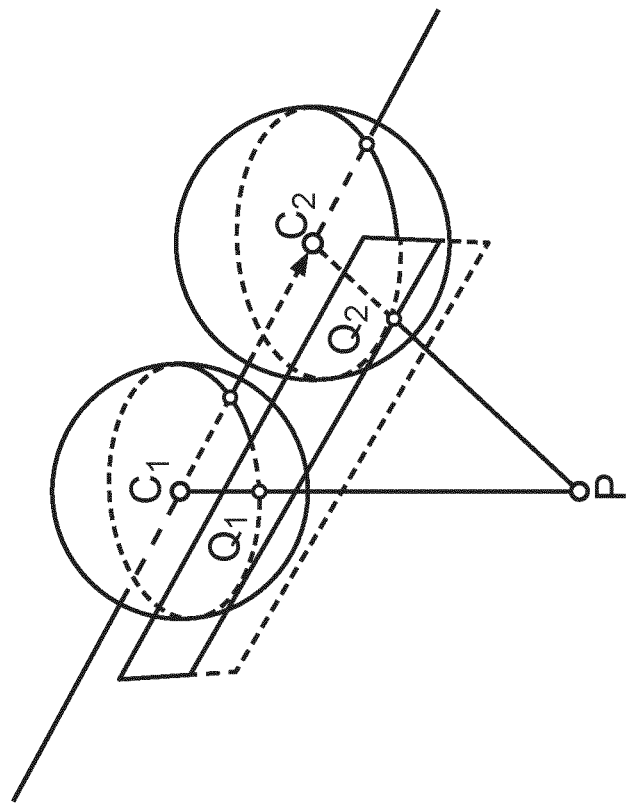
FIGS. 5a and 5b show spherical epipolar rectification surfaces for a moving camera, FIG. 5a showing the situation when the camera is looking along the axis of motion, and FIG. 5b showing when the camera is looking perpendicularly to the axis of motion.
Figure 5A:
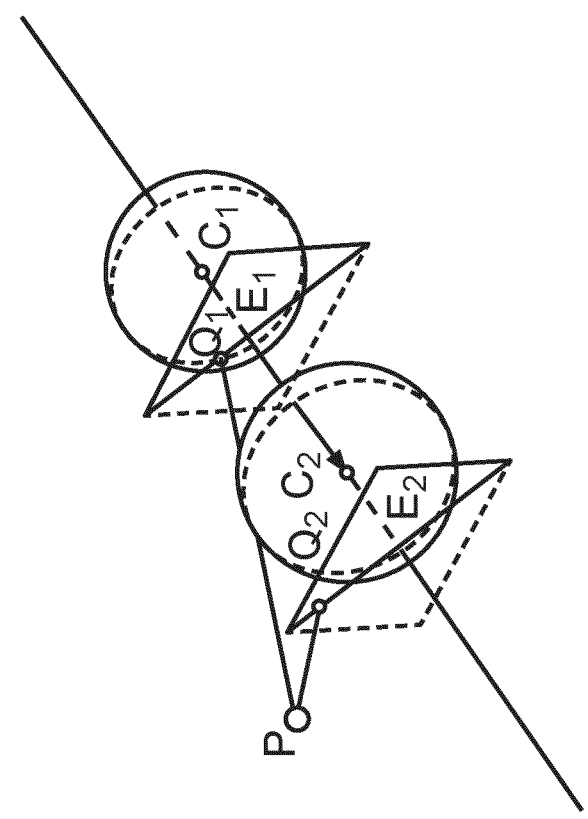

As an example, consider FIG. 5a in which, the two points $C_1$ and $C_2$, representing camera viewpoints, define the translation vector, which is the 'baseline'. The intersection of the baseline with each mapping surface is the epipole $E_1$ and $E_2$, and an arbitrary object-point P in the scene and the two points $C_1$ and $C_2$ define the epipolar plane. There is an infinite number of epipolar planes, rotated from each other about the baseline. This family of planes is known as an epipolar pencil. The intersection of any of these planes with the mapping surface defines the 'epipolar line' or curve in this case, which is a circle for a spherical mapping surface or an ellipse for an upright cylindrical mapping surface. The arbitrary object-point P is mapped into points $Q_1$ and $Q_2$ that belong to the same epipolar plane and to the conjugate epipolar curves that are mapped onto horizontal scanlines and at the same vertical offset in both rectified images.

The mapping of fisheye image pixels along an epipolar line or curve onto the pixels of a horizontal scanline in the rectified image can be achieved by 'sampling' rays along each epipolar line or curve through their respective viewpoint, and then tracing each ray back to the fisheye image using the intrinsic calibration and relative pose information. In this way, every pixel in the rectified image can be traced back to an image point in the fisheye image. The intensity value of the nearest source pixel can be obtained directly or by using a reconstruction and/or anti-aliasing filter that takes into account the values of neighbouring pixels such as a bilinear filter (i.e. bilinear interpolation may be used).

This process can be performed with very high computational efficiency by building a sparse look-up table for a subset of pixels in the rectified images (e.g. for every 16th pixel in the horizontal and vertical direction) that stores the corresponding fisheye image coordinates for that pixel with decimal precision e.g. with 12 integer bits and 4 fractional bits i.e. 16 bits per coordinate or 32 bits per pixel to conserve memory bandwidth and improve runtime performance. A software or hardware-accelerated 'renderer' can then be used to 'render' the rectified images very quickly using these look-up tables by interpolating the coordinates of the missing pixels. This reduces the number of rays that need to be computed per rectified image e.g. by a factor of 256 when 1:16 subsampling is used in both directions.

To conserve memory bandwidth, it is also possible to compress this look-up table by storing deltas rather than absolute image coordinates (e.g. 4-bit integer deltas with 4 fractional bits i.e. 8 bits per coordinate or 16 bits per pixel). In this case, an initial absolute coordinate is stored as a seed for the entire table or per row so that the absolute coordinates can be recovered incrementally from the stored deltas during rendering. In addition to that, the look-up table may be subdivided into smaller regions where each region is assigned an offset value to be applied to all deltas within that region during rendering.

For spherical surfaces, the rays can be sampled in angular intervals along each epipolar curve which is a circle for spherical surfaces. Epipolar planes can be defined in angular intervals rotating about the baseline such that each plane is mapped onto a discrete horizontal scanline in the rectified image. The mathematical functions that map the horizontal pixel coordinate x of the rectified image to a polar angle θ and the vertical pixel coordinate y (scanline number) to an azimuthal angle φ can be generalised as: θ=f(x) and φ=g(y) or in the simplest case can be linear: θ=$s_x$ x and φ=$s_y$ y where $s_x$ and $s_y$ are constant scale factors. The polar and azimuthal angles define the ray direction that is used for sampling the fisheye image pixels. More complex functions can be used for distributing the source image resolution across the rectified image in a favourable way.

Note that the notion of mapping surfaces such as spheres (FIGS. 5a and 5b) or cylinders (FIGS. 6a and 6b) is used only as a modelling aid since this process can be abstracted mathematically and programmatically. The intersection of an epipolar plane with the mapping surface, simply defines a path along which rays are sampled to achieve the desired alignment of epipolar lines or curves in the rectified images. Rays along this path can be sampled also in intervals of the 'arc length' rather than angular intervals. Both representations can be made equivalent, either by modifying the shape of the 3D surface (e.g. to an oblate or prolate spheroid) or the mapping function or both.

Figure 6B:
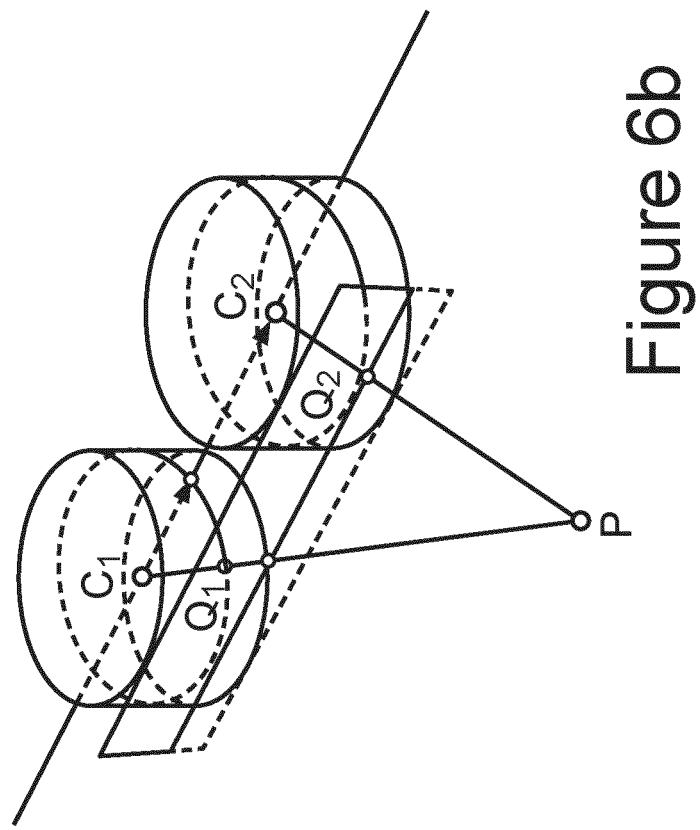
FIGS. 6a and 6b shows upright cylindrical epipolar rectification surfaces for a moving camera, FIG. 6a showing the situation when the camera is looking along the axis of motion, and FIG. 6b showing when the camera is looking perpendicularly to the axis of motion.
Figure 6A:
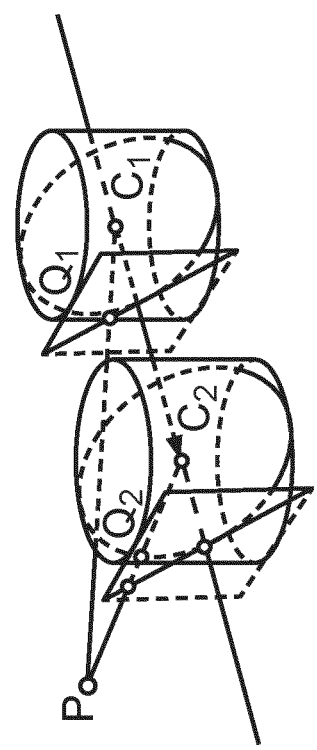
Figure 7:
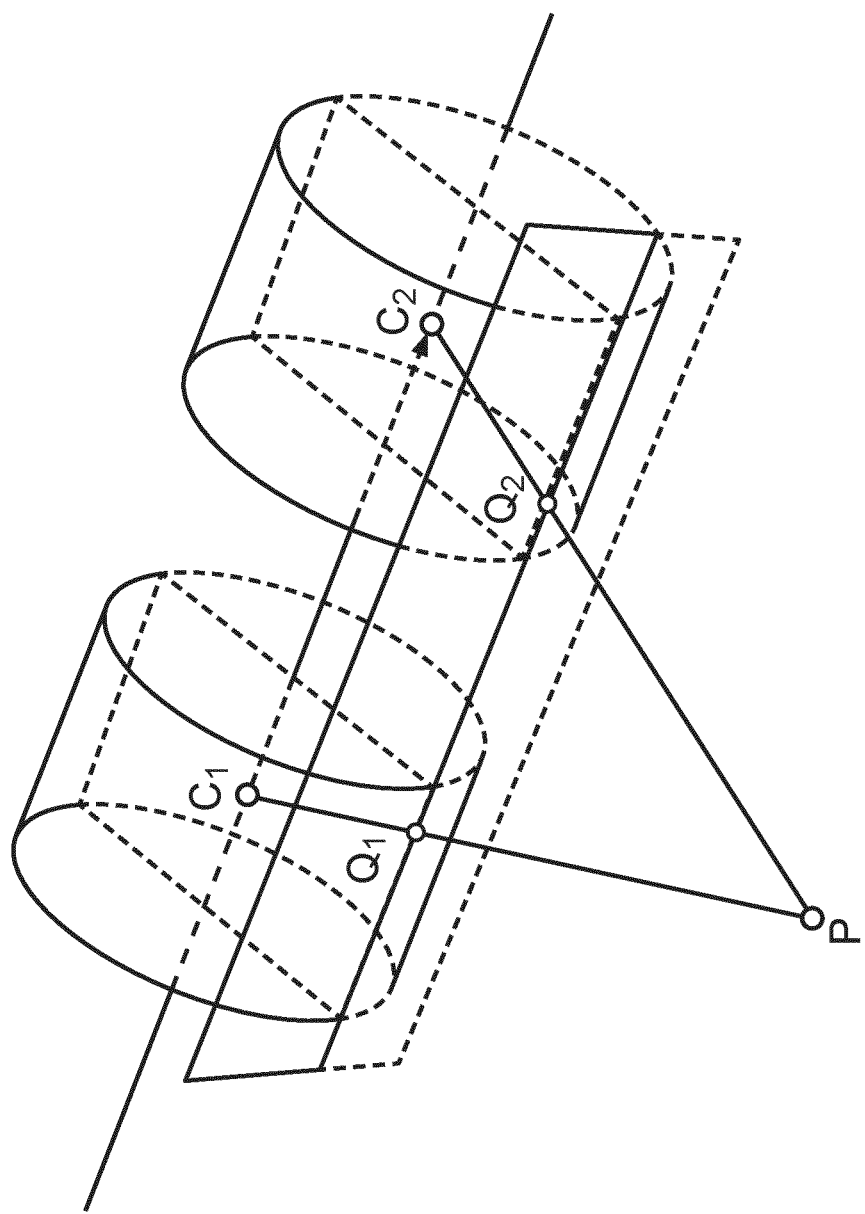
FIG. 7 shows cylindrical rectification surfaces for a moving camera when the camera is looking along the axis of motion and the cylinder is concentric with the axis of motion.

For upright cylindrical surfaces, as shown in FIGS. 6a and 6b, rays can be sampled in angular intervals along each epipolar curve which is an ellipse in this case but epipolar planes are defined in cartesian-coordinate intervals similar to a planar surface since the vertical dimension is linear. Similarly, for horizontal cylindrical surfaces, rays can be sampled in cartesian-coordinate intervals along each epipolar line since the horizontal dimension is linear and epipolar planes are defined in angular intervals rotating about the baseline.

Turning to FIGS. 5a, 5b, 6a, 6b, and 7; the planes represented by rectangles demonstrate how a planar surface with limited field of view could have been used for epipolar rectification instead of a spherical or cylindrical surface. For vehicle mounted cameras facing forwards and backwards, these planes can be orientated perpendicular to the baseline which is also the direction of camera motion. In this case, the epipolar lines emanate radially from the epipoles E1 and E2 and a polar sampling grid may be used to map them along horizontal scanlines in the rectified images. This configuration allows for the central part of the image to be rectified in a similar way to spherical surface modelling. The field of view is limited to a theoretical maximum of 180 degrees as the image plane approaches infinite size.

In the general case, the epipoles can also be in the image (specifically for forward motion when acquiring images from the forward or backwards direction) or near the image. In such a case, a linear transformation cannot be used. Here the radial transformation may be used. If, however the epipole is outside the image as in the case of forward motion when acquiring images from a leftward or rightward direction the transformation is similar to a linear one.

Fisheye Correction

A mesh is calculated to correct fisheye distortion. For each mesh point x, y in the undistorted images, a mesh point x', y' in distorted space can be defined according to the following:

$$a = (x - c_x)$$
$$b = (y - c_y)$$

-continued $$r = \sqrt{a^2 + b^2}$$
$$\theta = \operatorname{atan}(\frac{r}{f})$$
$$r' = k_4\theta^4 + k_3\theta^3 + k_2\theta^2 + k_1\theta$$
$$x' = r'\frac{a}{r} + c'_x$$
$$y' = r'\frac{b}{r} + c'_y$$

The value for the focal length f should be decided as follows. The distortion is minimum around the centre of distortion $c_x$, $c_y$. Pixels there should not be compressed (or magnified) in the output image. Around the centre of distortion, the $k_1$ parameter is dominant. If f=$k_1$ then for small angles θ around the distortion center, pixels in the undistorted image will use the same scale since r=f·tan(θ)≈fθ and r'≈$k_1$θ.

However, a camera may not allow access to its distortion parameters, in this case $k_1$ . . . $k_4$. In this case, the focal length can be determined by using an artificial ray with a small angle where distortion is minimal. The resulting pixel location can be used to estimate the focal length. When calculating the mesh for each mesh point (x, y) in direction in the selected virtual image plane, the following ray is created v=(x, −y, −f·s), where s is a scale factor.

This ray is rotated by the rotation matrix of the image plane relative to the camera's original image plane. The resulting vector can be used to return to the pixel coordinates in the original camera image.

Generic Single Step Image Mapping

Planar or radial planar mappings may operate on undistorted (fisheye corrected) images. The steps of correcting distortion and rectification can also be combined into a single image mapping process. This can be more efficient and save memory.

Figure 8B:
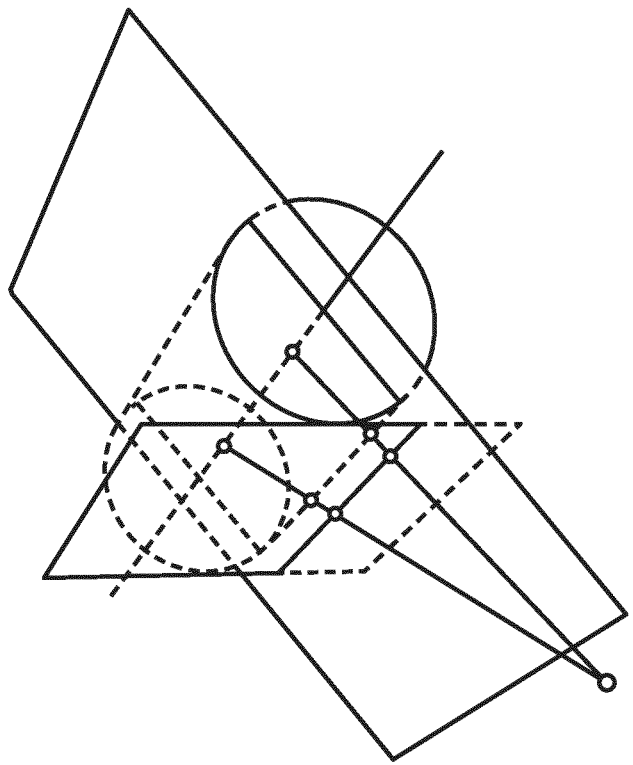
FIGS. 8a and 8b show baseline aligned spherical and cylindrical rectification surfaces respectively.
Figure 8A:
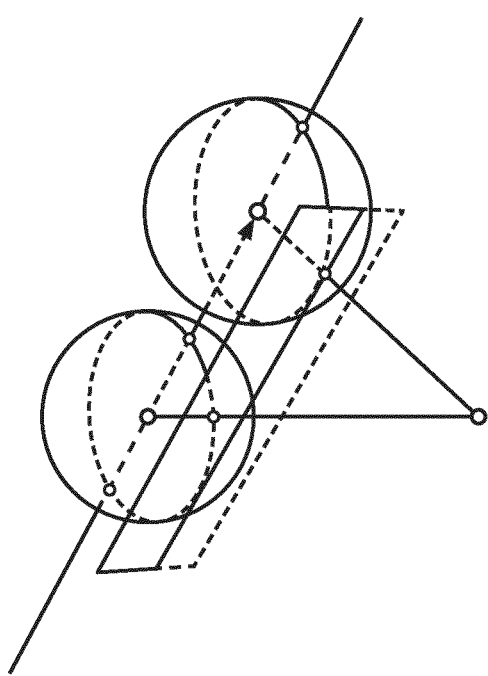

As explained above, it is not only planes but also other shapes such as spheres or cylinders than can be used for rectification. These other shapes can be beneficial in terms of the trade-off between image distortion and feasibility of depth estimation. In the general case, the epipolar lines are epipolar curves. FIGS. 8a and 8b show a baseline aligned spherical, planar and cylindrical mapping. The epipoles are determined by the movement of the camera.

Based on the spherical or planar mappings, the other mappings can be achieved by coordinate warping.

Determining the 3D Epipoles

In embodiments having a camera mounted on a vehicle, odometry from the vehicle system bus may provide the rotation and motion of the vehicle. To calculate the position of the epipoles for the current camera, the position of the previous camera is calculated in the current vehicle coordinate system. To calculate the epipole for the previous camera, the position of the current camera in the previous vehicle camera system is calculated. The vector from the current camera to the previous camera (or vice versa) points to the epipole and this vector is called the baseline. The following formula is based on the measured mechanical odometry:

$$e_c = R_{WVC}(R_{VWP} c_v - \delta) - c_v$$
$$e_p = R_{WVP}(R_{VWC} c_v + \delta) - c_v$$

where $R_{WV}^C$ is the current vehicle to world rotation and $R_{VW}^P$ is the previous world to vehicle rotation. The two matrices could be combined to a delta rotation matrix. $c_v$ is the position of the camera in vehicle coordinates (extrinsic calibration of the camera). δ is the delta translation in world coordinates. Visual odometry might provide the delta translation in vehicle coordinates in which case the equation is simplified further.

Baseline Alignment

For easier calculation of the mapping, the resulting images may be baseline aligned. Geometrically this means the virtual cameras are turned in such a way that it compensates the motion of the cameras so that the virtual cameras are perpendicular or collinear to the baseline. Hence, the vehicle coordinate system is rotated to the baseline. This rotation can be determined by rotation around an axis and angle. The angle is determined between the epipole vector and the vehicle coordinate axis as:

$$\cos(\theta) = -e_c \cdot (1,0,0) \text{ or } \cos(\theta) = -e_c \cdot (-1,0,0)$$

The rotation axis is the cross product of the two vectors:

$$u = e_c \times (1,0,0) \text{ or } u = e_c \times (-1,0,0)$$

The rotation matrix can then be determined e.g. using the standard axis-angle formula:

$$R = \begin{bmatrix} \cos\theta + u_x^2(1-\cos\theta) & u_x u_y(1-\cos\theta) - u_z\sin\theta & u_x u_z(1-\cos\theta) + u_y\sin\theta \\ u_y u_x(1-\cos\theta) + u_z\sin\theta & \cos\theta + u_y^2(1-\cos\theta) & u_y u_z(1-\cos\theta) - u_x\sin\theta \\ u_z u_x(1-\cos\theta) + u_y\sin\theta & u_z u_y(1-\cos\theta) + u_x\sin\theta & \cos\theta + u_z^2(1-\cos\theta) \end{bmatrix}$$

Using this rotation (calling it $R_{epi}^C$), any ray in epipolar coordinate system may be transformed to the vehicle coordinate system and vice versa.

Epipolar Coordinate System

Figure 9:
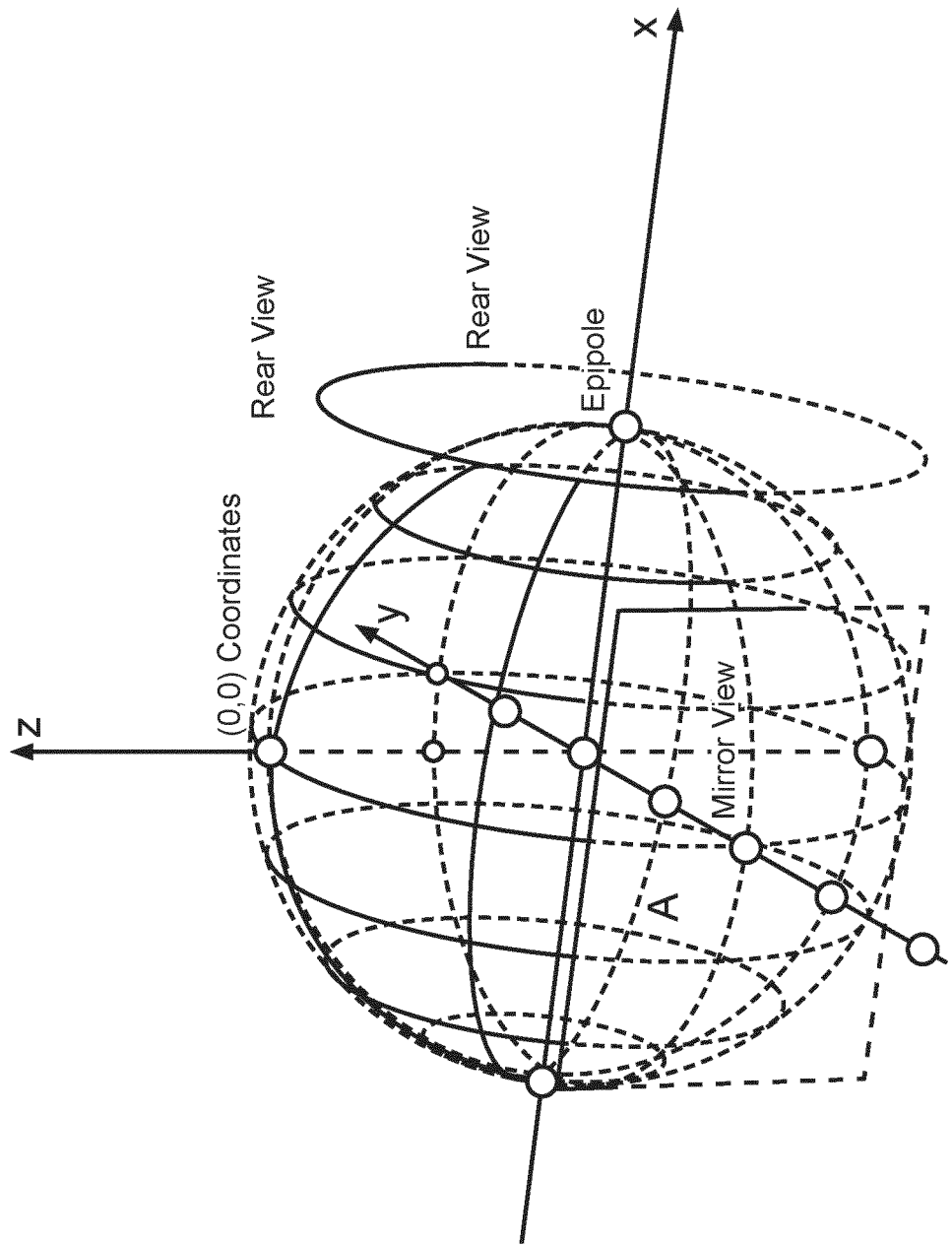
FIG. 9 shows a spherical coordinate system for epipolar rectification.

For the definition of a mapping for rectification, a spherical coordinate system is defined that has the epipoles as poles and uses latitude and longitude angles, which is shown in FIG. 9. Without any rotation (pure forward or backward motion of the car) the epipoles point in the direction of the X-axis of the vehicle coordinate system. In that case ±90° latitude points along the X-axis and 0° longitude points to a point above the car (0, 0, 1). The circles surrounding the sphere defining planes that are parallel to the X axis show the epipolar circles on a sphere. Any mapping should map these circles to horizontal lines in the rectified images.

Spherical Mapping

When considering the geometry shown in FIG. 9, in a spherical mapping, the epipolar coordinates directly map to x and y coordinates in the output image. Latitude maps to y and longitude to an x coordinate. The pixel density of the output image defines the density of angles. For each view, a range of longitude and latitude may be defined. For example, in the context of the vehicle shown in FIG. 1:

Rear camera: Longitude [0°, 360°], latitude [−10°, −90°]
Front camera: Longitude [0°, 360°], latitude [10°, 90°]
Mirror-left camera: Longitude [70°, 180°], latitude [−80°, 80°]
Mirror-right camera: Longitude [−70°, −180°], latitude [−80°, 80°]

Now these are mapped to camera image coordinates in the following sequence:

Convert epipolar coordinates to ray vectors with (x, y, z) coordinates.
Rotate the ray from epipolar coordinates to vehicle coordinates.
Rotate the ray from vehicle to camera coordinate system.
Use camera projections to determine raw source image coordinate.

The following formula converts the epipolar coordinates to a ray vector with (x, y, z) coordinates:

$$r = (\sin(\gamma), \sin(\varphi)\cos(\gamma), \cos(\varphi)\cos(\gamma))$$

with φ longitude and γ latitude. The ray is converted to a camera ray by:

$$r_c = R_{VC}(R_{epiC}\, r)$$

$R_{VC}$ is the camera rotation matrix from vehicle to camera coordinate system. A builtin function is then applied to retrieve the pixel coordinate in the source image for epipolar coordinate (φ, γ).

Baseline Aligned Planar Mapping

For a planar mapping, the same mechanism is used as for the spherical mapping. The planar coordinates (x, y) are converted to epipolar coordinates first but then the calculation steps are the same. The conversion is:

$$(\varphi, \gamma) = (a\tan(y), a\tan(x))$$

In the case of the rear and front camera on vehicles, since the latitude values converge in a singularity requiring a radial mapping, the conversion is instead:

$$(\varphi, \gamma) = (y, a\tan(x))$$

The viewports can be defined similarly to the spherical mapping as opening angles. These can be converted to ranges of planar coordinates that with given pixel density can be converted to pixel ranges.

Cylindrical Mapping

The cylindrical mappings are a mixture of spherical and planar. They are especially useful mapping for mirror view cameras on vehicles. The mapping for vertical or horizontal cylinders respectively is:

$$(\varphi, \gamma) = (\varphi, a\tan(x)) \text{ or } (\varphi, \gamma) = (a\tan(y), \gamma)$$

Conical Mapping

Conical and spherical mapping have the property that they can reach closer to the focus of expansion than cylindrical mapping, as due to the shape of the mapping surface, less stretching is necessary. The downside is that these mapping do not maintain the shape of an object when it moves from one camera image to the next. However, range is much better on the conical views and detection quality especially nearby is better than in cylindrical mapping.

Figure 10:
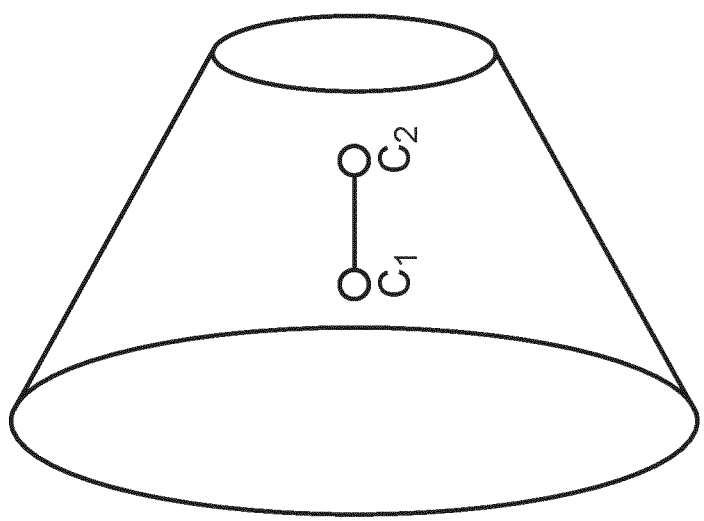
FIG. 10 shows a conical rectification surface.

On some vehicles, conical viewports may degrade ground surface and kerb detection, but they are computationally less expensive than spherical. An example of a conical mapping surface is shown in FIG. 10. When considering embodiments with cameras mounted on a vehicle, conical views are only likely to be used for front and back facing cameras not side facing cameras.

Generic Mapping

Instead of spheres, planes or cylinders also other mappings are possible. They can be defined by three functions f(x), g(y) and h(x). Assuming the camera configuration in FIG. 1, the following conversions may be given:

For mirror (left and right view): (φ, γ) = (g(y), f(x))
For rear and front view: (φ, γ) = (y, h(x))
For the planar case: f(x) = h(x) = a tan(x), g(y) = a tan(y)
For the spherical case: f(x) = h(x) = x, g(y) = y Custom designed functions may be beneficial in the right balance between field of view and spatial resolution in the depth map or distortion for the stereo matcher. Ideally, the following targets should be met for the functions f(x), g(y) and h(x):

a tan(x)≤f(x)≤x and a tan(y)≤g(y)≤y to achieve a good balance between spatial resolution, field of view and distortion;

x≤≤h(x)≤c·x requiring that the function stretches near the epipoles to have more disparity resolution there but fall back to linear behaviour for larger x; and simple formulation with little computational effort.

For example:

$$f(x)=0.5(x+a\ \tan(x))$$

$$h(x)=x+(\sqrt[4]{x}\cdot e^{-x})$$

Mapping to Mesh

Calculating the mapping from epipolar coordinates to source pixel coordinate for every single destination pixel is time consuming. This can be sped up by calculating these mappings only for a grid of destination coordinates. The mapping can use automatic destination coordinate generation using a regular grid in the destination coordinates. For each node on the grid, the mapping to raw source pixel coordinates are calculated. With bilinear interpolation the pixels in the destination image are mapped according to the provided mesh. The grid cell size may be defined in such a way that the runtime of the mesh creation is feasible but on the other hand the distortions due to the mesh are small enough.

Combination of Surfaces

Figure 11:
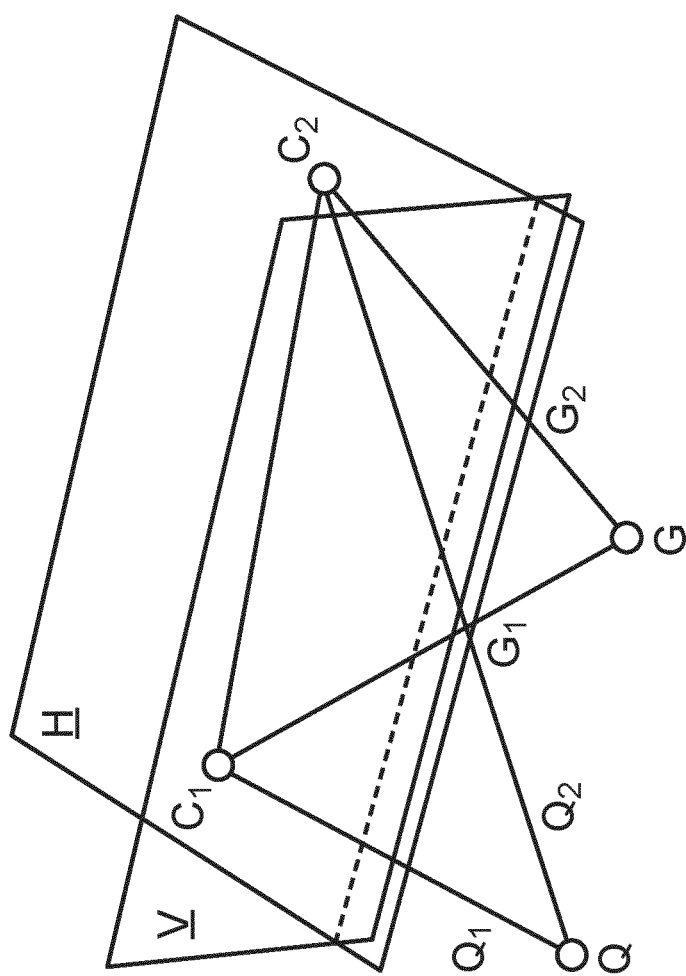
FIG. 11 shows a rectification surface comprising multiple planes.

It is also possible to have a combination of surfaces for the epipolar mapping, including using multiple planes for epipolar rectification. This is discussed in "Omnidirectional stereo vision using fisheye lenses" by Drulea et al. referenced above. As an example, a mapping surface comprising two planes is shown in FIG. 11. If this is considered in the context of vehicle mounted cameras, the first horizontal plane H would, for example, be used to reconstruct the ground surface; and the second plane V, which is perpendicular to the first plane, would be used for other objects.

It is possible to use multiple other surfaces. Since cylindrical (and planar) view ports show a good performance near the car when it comes to detecting ground surface, kerbs and objects it is advantageous to keep benefitting from their properties. To have detections also near the focus of expansion another surface can be added just to cover this area. Ideally, the mapping surface should balance stretching of the image. Since the focus of expansion is a small part of the image, the view port should also be small; and it should cover the range from the end of detections of the cylindrical views and get close to the focus of expansion.

Figure 12B:
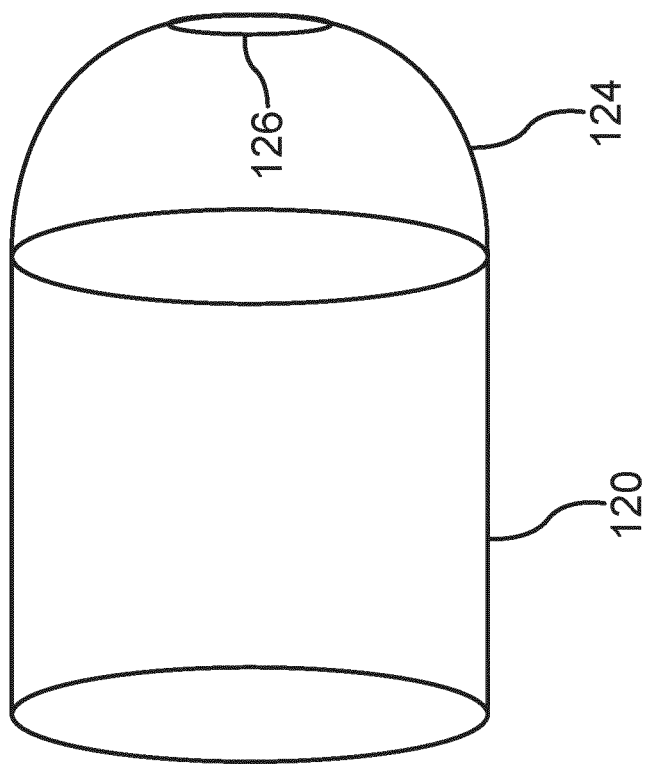
FIGS. 12a and 12b each show a respective multipart rectification surface according to embodiments of the present invention.
Figure 12A:
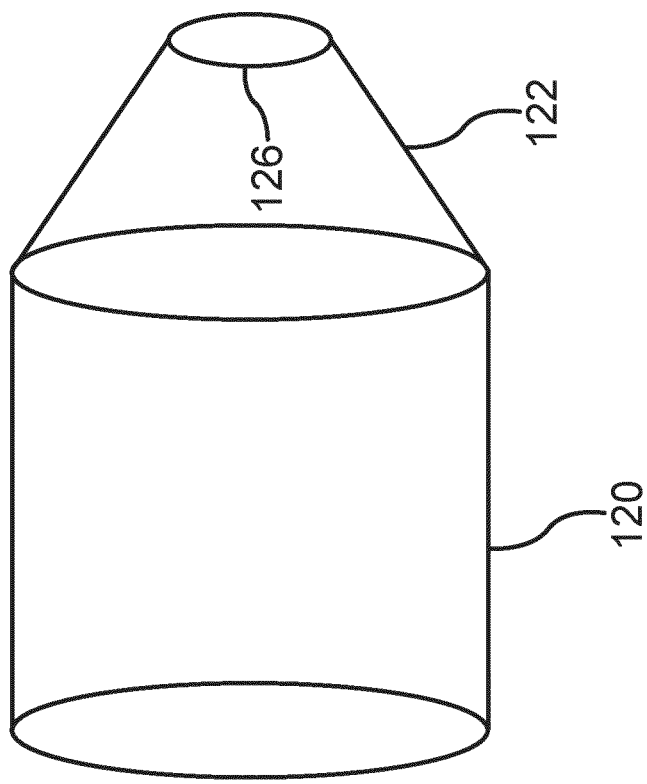

FIG. 12a illustrates the combination of cylindrical 120 and frusto-conical 122 (based on a cut-off cone) viewport. Such a modified surface is advantageous for vehicle front and rear cameras, where the camera moves into/out of the scene. The wing mirror cameras typically only use cylindrical surfaces, as they move laterally to the scene.

FIG. 12b shows another modified surface in which a hemispherical surface 124 has been added to the cylindrical surface 120. Note, for both modified surfaces, it is not useful to map the area immediately adjacent the focus of expansion, as a valid disparity and depth cannot be extracted in that region. Therefore, the considered surface may have a portion of the surface 126 missing at the focus of expansion as shown in FIG. 12a and FIG. 12b.

Depth Calculation and Point Cloud Generation

After running the stereo matcher, the resulting disparity map is an image which contains horizontal movements from the previous image to the current image. These movements may be converted to depth information or directly converted to a point cloud of 3D points. Depending on the epipolar rectification method used, this conversion may be calculated using different equations.

Planar Depth Calculation

The baseline aligned planar epipolar rectification is a special case that allows for a simple calculation procedure to determine depth. Turning to FIG. 13a and considering cameras mounted on the side of a vehicle. The depth d can be calculated using similar triangles. The disparity q is similar to the baseline b=|δ| relative to focal length f with depth d:

$$d = \frac{f \cdot b}{q}$$

where f and q may be given in pixels.

Figure 13B:
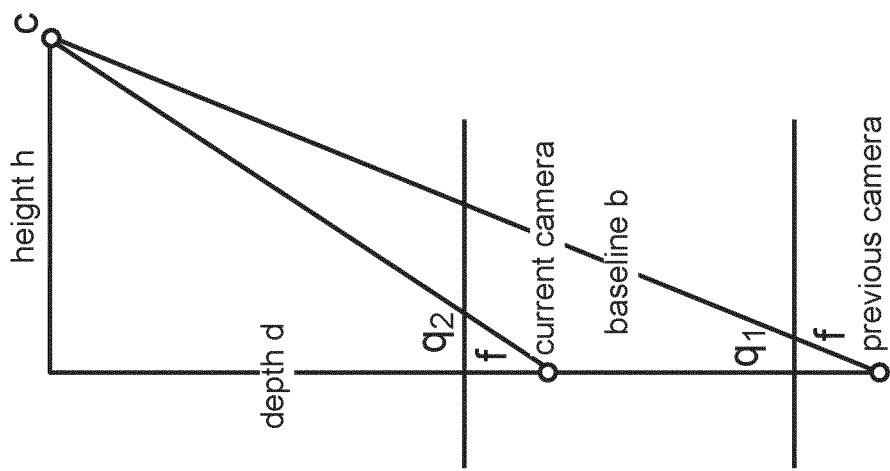
FIGS. 13a and 13b illustrate geometric relationships to calculate depth using planar rectification surfaces.
Figure 13A:
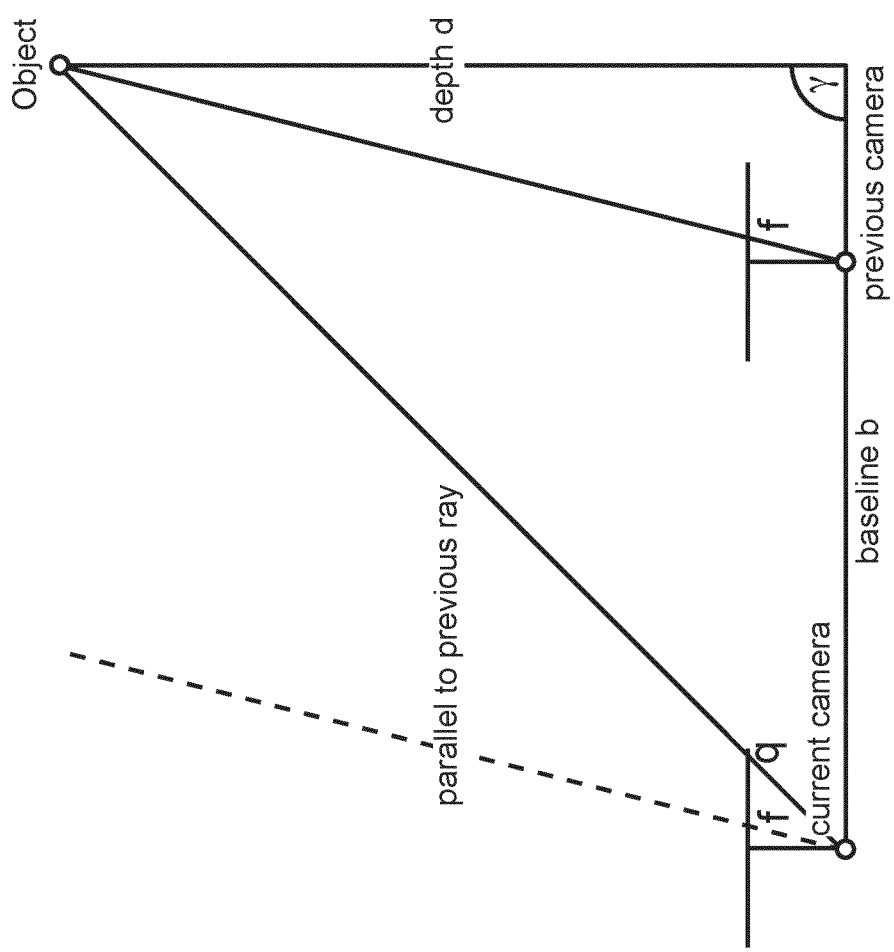

Relatedly, turning to FIG. 13b and considering cameras mounted on the front or rear of a vehicle, the following relationships can be derived:

$$\frac{f}{q_1} = \frac{d+b}{h}$$

$$\frac{f}{q_2} = \frac{d}{h}$$

which may be simplified to:

$$d = b\frac{q_1}{q_2 - q_1}$$

As can be seen there is a dependency not only on the disparity $q_2-q_1$ but also on $q_1$. This means that the depth calculation in the disparity map depends on where you are in the map. Also, this means that objects with small $q_1$ have smaller disparity at the same distance than objects with larger $q_1$. This reduces spatial resolution in these cases since the feature matcher operates on a pixel level. Naturally the spatial resolution approaches zero as the epipoles are approached. However, a different mapping function could reduce the effect by equalising the depth to disparity relationship to some extent.

Spherical Depth Calculation

Figure 14:
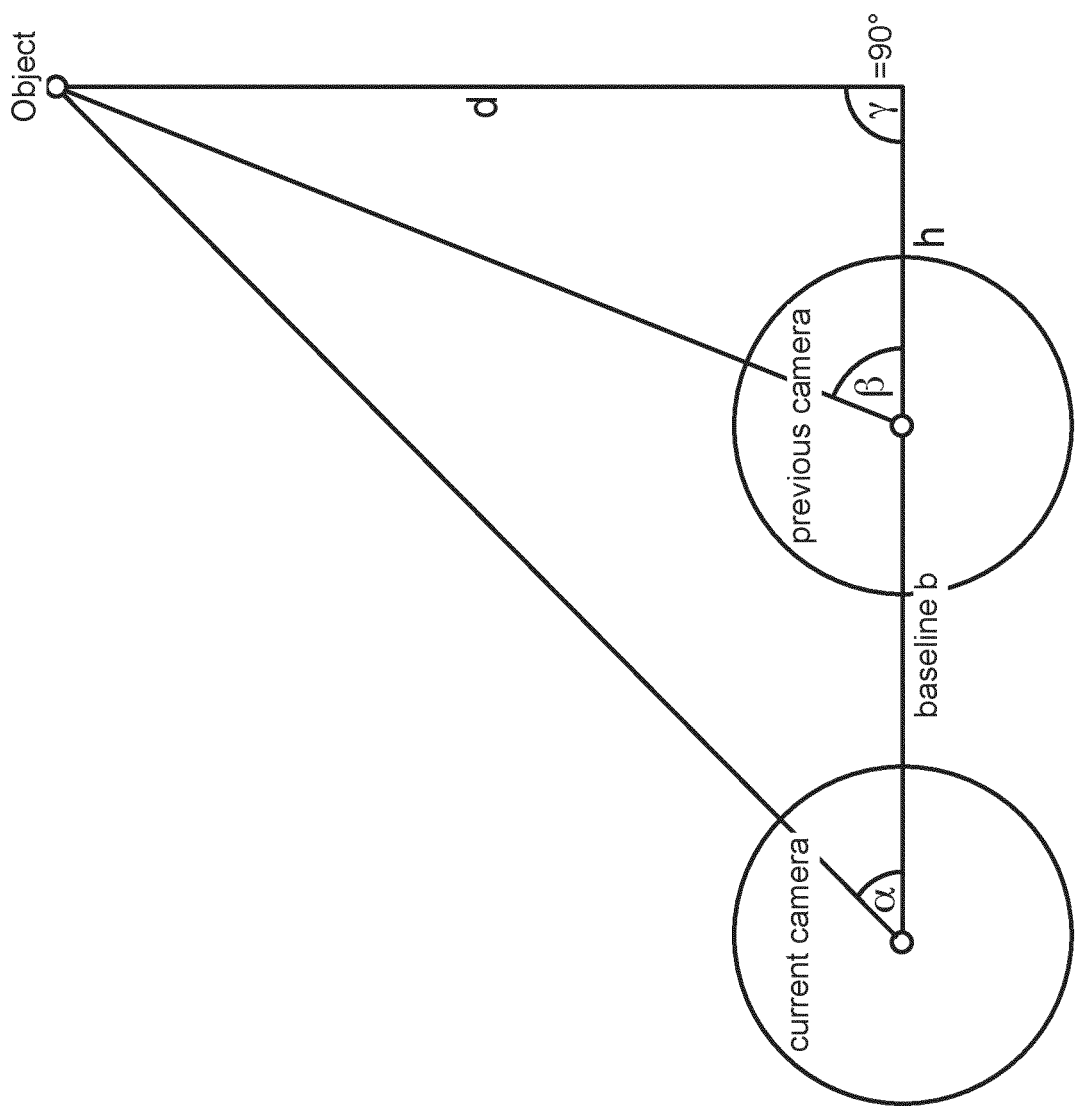
FIG. 14 illustrate geometric relationships to calculate depth using spherical rectification surfaces.

In the spherical case, shown in FIG. 14, the depth calculation is more difficult but by considering a single epipolar circle in the spherical mapping, the following triangle relationships can be derived:

$$d = b\frac{\sin(\alpha)\sin(\beta)}{\sin(\beta-\alpha)}\frac{b}{\tan(90-\alpha)-\tan(90-\beta)} =$$

$$h = b\frac{\sin(\alpha)\cos(\beta)}{\sin(\beta-\alpha)}\frac{\tan(\alpha)}{\tan(\beta)-\tan(\alpha)} = b$$

The angles α and β (latitudes) correspond to horizontal pixel locations of matching pixels in the spherically rectified images and are easy to retrieve. Additionally, the longitude may be taken into account. The depth d calculated above is a distance from the baseline so:

$$d'=\sin\ \sin(\varphi)d$$

is the depth from a virtual camera plane. While the spherical mapping provides great field of view the disparity to distance relationship is not very favourable. Approximate variants of the equations above for small angles α, β are:

$$d \sim b \frac{\alpha\beta}{\beta-\alpha}$$

$$h \sim \beta \frac{\alpha}{\beta-\alpha}$$

The relationship of disparity to depth is not constant and in case of the depth even has a square dependency on the incident angle. This means that the spatial resolution is quite low at the edges of the rectified images for mirror view cameras. As a result, a different mapping that balances the field of view and spatial resolution might be advantageous.

Cylindrical Depth Calculation

The cylindrical case is again a mixture between planar and spherical. Depending on whether it is a horizontal or vertical cylinder, the depth is calculated using either the planar or spherical way described above. In case of the planar depth, the longitude adjustment is then performed equivalently to the spherical longitude adjustment.

Generic Depth Calculation

For the spherical mapping the following equations are employed:

$$d = b\frac{\sin(\alpha)\sin(\beta)}{\sin(\beta-\alpha)} \frac{b}{\tan(90-\alpha)-\tan(90-\beta)} =$$

$$h = b\frac{\sin(\alpha)\cos(\beta)}{\sin(\beta-a)} \frac{\tan(\alpha)}{\tan(\beta)-\tan(\alpha)} = b$$

According to the above definitions (see the 'Generic Mapping' section) the following may be used:

$\alpha=f(x_1), \beta=f(x_2)$ or $\alpha=h(x_1), \beta=h(x_2)$

Taking the longitude into account yields:

$d'=\sin(g(y))d$

Point Cloud from Depth

If the above methods are used to calculate distances of individual disparity map pixels relative to a virtual camera plane, the resulting coordinates may be converted to vehicle coordinates to form a point cloud. Assuming Euclidean coordinates in the epipolar reference frame relative to a selected camera (current) matrix $R_{epi}^{C}$ may be used to rotate to vehicle coordinate system and add the extrinsic position of the camera to get vehicle coordinates. Computationally, this approach is very efficient for baseline aligned planar mapping since for each pixel very few and very simple operations are involved.

Point Cloud by Triangulation

As an alternative approach to forming a point cloud from depth, triangulation may be used to generate a point cloud from the disparity map. This takes as input: two rays and motion vector of the vehicle in the considered coordinate system. With a few basic and known operations (multiplications, additions, subtraction and divisions) the output of the 3D position of the triangulated rays can be obtained.

For determining the rays from the disparity map, two approaches can be selected: using the above-mentioned depth calculation above, or using a precalculated grid of rays.

The former approach is less efficient than to generate the point cloud directly from depth values. The latter approach is efficient. The rays needed are also calculated when generating the mesh for epipolar mapping referred to above. The intermediate result of:

$r_v = R_{epiC}\, r$ is available for each node in the mesh and can be stored for later use. r was the ray after rotation from the epipolar coordinate system to the vehicle coordinate system. Now, for each pixel in the disparity map, the corresponding ray can be bilinearly (or with more advanced methods, e.g. splines) interpolated from the rays stored in the nodes around the pixel. When choosing the grid cell size for the epipolar mapping, the method described in this section may be taken into account so that the accuracy of the resulting point cloud is sufficient.

Triangulation Method

Since the method for triangulation is known, only the final equations are presented for brevity. Given two vehicle rays $r_c$, $r_p$ and the delta motion of the vehicle δ the following six quantities may be defined:

$a = r_c \cdot r_c = |r_c|^2$ $b = r_p \cdot r_c$ $c = r_p \cdot r_p = |r_p|^2$ $d = r_c \cdot (-\delta)$ $e = r_p \cdot (-\delta)$ $p = ac - b^2$ If both rays are unit vectors, a and c will have a value of one and can simplify the following formulas further:

$$v_1 = \frac{be - cd}{p}$$

$$v_2 = \delta + r_p \frac{ae - bd}{p}$$

to provide the two intersections of the rays. Normally two rays in 3D space don't necessarily intersect. The average of the two 3D points will be the closest point of both rays. In our case, however, the two rays intersect epipolar curves and hence will have an intersection. This means only one of the equations above would be sufficient. However, inaccuracies in the calculation of the rays such as arising from interpolation can be at least partially accounted for by calculating both 3D points and using the average result as the final 3D point output.

Application

By using the above techniques, images from a moving monocular camera on a vehicle, with a wide field of view lens, can be used to form a portion of a point cloud that approximates a portion of local topography of an environment surrounding the vehicle as it moves through the environment. Images that are formed by stitching together the images from the moving monocular camera can then be mapped onto the surface defined by the point cloud. An image of the resultant virtual scene can be evaluated from any virtual camera pose. As the virtual image has a similar topography to the imaging scene regardless of the virtual camera pose, the images provided will be realistic.

The invention claimed is:

1. A method for forming a point cloud corresponding to the topography of an imaged environment comprising:

acquiring a first image of the environment with a camera having a wide field of view lens mounted on a vehicle;

changing the camera pose by an adjustment that is more than a threshold;

acquiring a second image of the environment with the camera at the changed pose;

mapping the first image onto a first surface to form a first mapped image;

mapping the second image onto a second surface to form a second mapped image, the first surface and the second surface being defined by the same non-planar geometry, wherein the non-planar geometry defines a cylindrical surface and is symmetric about an optical axis of the camera, wherein the non-planar geometry comprises:
 a first non-planar surface; and
 a second non-planar surface, the first non-planar surface extending from the camera to the second non-planar surface, and the second non-planar surface converging from the first non-planar surface towards the optical axis;

dividing the one of the first or second mapped images into blocks of pixels;

for each block of pixels, forming a depth map by performing a search through the other of the first or second mapped images to evaluate a disparity in the position of the location of the block of pixels in each of the mapped images;

converting the depth map into a portion of a point cloud corresponding to the local topography of the environment surrounding the vehicle as it moves through the environment; and scaling the point cloud according to the adjustment in camera pose.

2. The method of claim 1, wherein performing a search comprises performing a one-dimensional search of image data along rectified epipolar lines.

3. The method of claim 1, further comprising assessing the change in camera pose with odometry information supplied from vehicle odometry sensors.

4. The method of claim 3, wherein the wide field of view lens is a fisheye lens.

5. The method of claim 4, wherein the non-planar geometry defines a conical surface.

6. The method of claim 1, wherein the non-planar geometry defines a spherical surface.

7. The method of claim 1, wherein the second non-planar surface defines a frusto-conical surface.

8. The method of claim 1, wherein the second non-planar surface defines a hemispherical surface.

9. The method of claim 8, wherein the mapping is performed by building a sparse look-up table for a subset of pixels in the mapped images and storing the corresponding camera image coordinates for that pixel with decimal precision.

10. A vehicle for movement in a forward direction, the vehicle comprising:
 a camera with an optical axis aligned to the forward direction; and
 a camera with an optical axis aligned in a rearward direction, the rearward direction opposing the forward direction,
 wherein each camera operates according to the method of claim 1.

11. The vehicle of claim 10, wherein the vehicle further comprises:

two cameras aligned in opposing directions that are perpendicular to the forward direction, wherein the two cameras operate according to the method of claim 1.

12. The vehicle of claim 10, wherein the cameras provide information to a system for automated parking or autonomous driving of the vehicle.

13. A method for displaying the scene around a vehicle comprising:
 acquiring images from a plurality of cameras located around the periphery of the vehicle with overlapping fields of view;
 stitching the images into a stitched image; and
 mapping the stitched image onto a surface defined by the point cloud produced by the method of claim 1.

14. A method for forming a point cloud corresponding to the topography of an imaged environment comprising:
 acquiring a first image of the environment with a camera having a wide field of view lens mounted on a vehicle;
 changing the camera pose by an adjustment that is more than a threshold;
 acquiring a second image of the environment with the camera at the changed pose;
 mapping the first image onto a first surface to form a first mapped image;
 mapping the second image onto a second surface to form a second mapped image, the first surface and the second surface being defined by the same non-planar geometry,
 wherein the non-planar geometry defines a cylindrical surface and is symmetric about an optical axis of the camera,
 wherein the non-planar geometry comprises:
  a first non-planar surface; and
  a second non-planar surface, the first non-planar surface extending from the camera to the second non-planar surface, and the second non-planar surface converging from the first non-planar surface towards the optical axis,
  wherein the second non-planar surface defines a frusto-conical surface;
 dividing the one of the first or second mapped images into blocks of pixels;
 for each block of pixels, forming a depth map by performing a search through the other of the first or second mapped images to evaluate a disparity in the position of the location of the block of pixels in each of the mapped images;
 converting the depth map into a portion of a point cloud corresponding to the local topography of the environment surrounding the vehicle as it moves through the environment; and
 scaling the point cloud according to the adjustment in camera pose.

15. A method for forming a point cloud corresponding to the topography of an imaged environment comprising:
 acquiring a first image of the environment with a camera having a wide field of view lens mounted on a vehicle;
 changing the camera pose by an adjustment that is more than a threshold;
 acquiring a second image of the environment with the camera at the changed pose;
 mapping the first image onto a first surface to form a first mapped image;
 mapping the second image onto a second surface to form a second mapped image, the first surface and the second surface being defined by the same non-planar geometry, wherein the non-planar geometry defines a cylindrical surface, wherein the non-planar geometry is symmetric about an optical axis of the camera, wherein the non-planar geometry comprises:
- a first non-planar surface; and
- a second non-planar surface, the first non-planar surface extending from the camera to the second non-planar surface, and the second non-planar surface converging from the first non-planar surface towards the optical axis, wherein the second non-planar surface defines a hemispherical surface;

dividing the one of the first or second mapped images into blocks of pixels;

for each block of pixels, forming a depth map by performing a search through the other of the first or second mapped images to evaluate a disparity in the position of the location of the block of pixels in each of the mapped images;

converting the depth map into a portion of a point cloud corresponding to the local topography of the environment surrounding the vehicle as it moves through the environment; and scaling the point cloud according to the adjustment in camera pose.

16. The method of claim 15, wherein the mapping is performed by building a sparse look-up table for a subset of pixels in the mapped images and storing the corresponding camera image coordinates for that pixel with decimal precision.

* * * * *